United States Patent
Yamada

(10) Patent No.: US 11,247,860 B2
(45) Date of Patent: Feb. 15, 2022

(54) SHEET CONVEYING APPARATUS, IMAGE READING APPARATUS, AND IMAGE FORMING APPARATUS

(71) Applicant: CANON KABUSHIKI KAISHA, Tokyo (JP)

(72) Inventor: Kaname Yamada, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 16/436,741

(22) Filed: Jun. 10, 2019

(65) Prior Publication Data

US 2020/0002113 A1  Jan. 2, 2020

(30) Foreign Application Priority Data

Jun. 27, 2018 (JP) .............................. JP2018-122287

(51) Int. Cl.
*B65H 5/36* (2006.01)
*H04N 1/00* (2006.01)
*B65H 5/06* (2006.01)

(52) U.S. Cl.
CPC .............. *B65H 5/36* (2013.01); *B65H 5/062* (2013.01); *H04N 1/0066* (2013.01); *H04N 1/00602* (2013.01); *H04N 1/00615* (2013.01)

(58) Field of Classification Search
CPC ........ B65H 2404/6111; B65H 2404/64; B65H 2404/65; B65H 5/062; B65H 5/36; B65H 9/006; H04N 1/00602; H04N 1/00615; H04N 1/0066
USPC ................................................. 358/498, 497
See application file for complete search history.

(56) References Cited

U.S. PATENT DOCUMENTS

| | | | | |
|---|---|---|---|---|
| 8,734,037 B2* | 5/2014 | Kawaguchi | ............ | B41J 11/008 400/578 |
| 2004/0188927 A1* | 9/2004 | Tanabe | .................... | B65H 29/14 271/207 |
| 2006/0181013 A1* | 8/2006 | Kondo | ................. | B65H 29/041 271/264 |
| 2011/0266742 A1* | 11/2011 | Sato | ..................... | B65H 23/038 271/228 |
| 2012/0248678 A1* | 10/2012 | Serizawa | ............... | B65H 7/125 271/10.01 |
| 2017/0336730 A1* | 11/2017 | Yamada | ............. | H04N 1/00519 |

(Continued)

FOREIGN PATENT DOCUMENTS

JP    2012-197171 A    10/2012

*Primary Examiner* — Negussie Worku
(74) *Attorney, Agent, or Firm* — Canon U.S.A., Inc. I.P. Division

(57) ABSTRACT

A sheet conveying apparatus includes a sheet conveyance section, a roller pair unit, first and second guides, and a movable guide including an upstream portion extending upstream in the sheet conveying direction with respect to the nip portion and a downstream portion extending downstream in the sheet conveying direction with respect to the nip portion. The roller pair unit nips the sheet, warps the sheet in a case where a leading end of the sheet conveyed by the sheet conveyance section comes into contact with the roller pair unit, and conveys the sheet. The first guide opposes a first side of the sheet and guides the sheet. The second guide opposes a second side of the sheet. The movable guide opposes the first side of the sheet and moves in such a manner that the downstream portion of the movable guide moves closer to or away from the second guide.

12 Claims, 5 Drawing Sheets

(56) References Cited

U.S. PATENT DOCUMENTS

2018/0103156 A1\* 4/2018 Yamada .............. G03G 15/602
2021/0122596 A1\* 4/2021 Yamada .................. B65H 7/02

\* cited by examiner

SHEET CONVEYING APPARATUS, IMAGE READING APPARATUS, AND IMAGE FORMING APPARATUS

BACKGROUND

Field

The present disclosure relates to a sheet conveying apparatus that conveys sheets and to an image reading apparatus and an image forming apparatus that include the sheet conveying apparatus.

Description of the Related Art

A known image forming apparatus such as a digital copier may include an image reading apparatus equipped with an auto document feeder (hereinafter referred to as "ADF") that automatically feeds sheets or documents to be read. This type of the image reading apparatus reads image information by optically scanning the surface of a document while the document is being conveyed by the ADF.

In recent years, image reading apparatuses have been desired to read various types of sheets, and ADFs have also been desired to prevent skew feeding of a document, which results in skewed image reading, irrespective of a type of document (in terms of unit weight or material). Japanese Patent Laid-Open No. 2012-197171 discloses a document reading apparatus in which a registration roller pair unit is disposed at two positions on a conveyance path from a document placement tray to an image reading unit. The document reading apparatus can thereby correct skew feeding of a document twice before reading an image thereon.

SUMMARY

A registration roller pair unit corrects skew feeding by bringing the end of the document into contact with the registration roller pair unit. However, even in the case of disposing such a registration roller pair unit, a sheet may be subject to skew feeding at a position downstream of the registration roller pair unit. According to a study by the inventors, such skew feeding may be caused by the behavior of a sheet both upstream and downstream of the registration roller pair unit.

The present disclosure provides a sheet conveying apparatus that can convey a sheet with its orientation being stably maintained and provides an image reading apparatus and an image forming apparatus that include the sheet conveying apparatus.

According to an aspect of the present disclosure, a sheet conveying apparatus includes a sheet conveyance section configured to convey a sheet in a sheet conveying direction, a roller pair unit configured to nip and convey the sheet, and to warp the sheet in a case where a leading end of the sheet conveyed by the sheet conveyance section comes into contact with the roller pair unit, a first guide configured to oppose a first side of the sheet and to guide the sheet, a second guide configured to oppose a second side of the sheet that is opposite to the first side, and a movable guide including an upstream portion extending upstream in the sheet conveying direction with respect to the nip portion and a downstream portion extending downstream in the sheet conveying direction with respect to the nip portion, wherein the movable guide is configured to oppose the first side of the sheet and to be movable in such a manner that, in a case where the movable guide moves, the downstream portion of the movable guide moves closer to or away from the second guide.

Further features of the present disclosure will become apparent from the following description of exemplary embodiments with reference to the attached drawings.

DESCRIPTION OF THE EMBODIMENTS

Embodiments for implementing the present disclosure will be described with reference to the drawings.

Image Forming Apparatus

Figure 1:
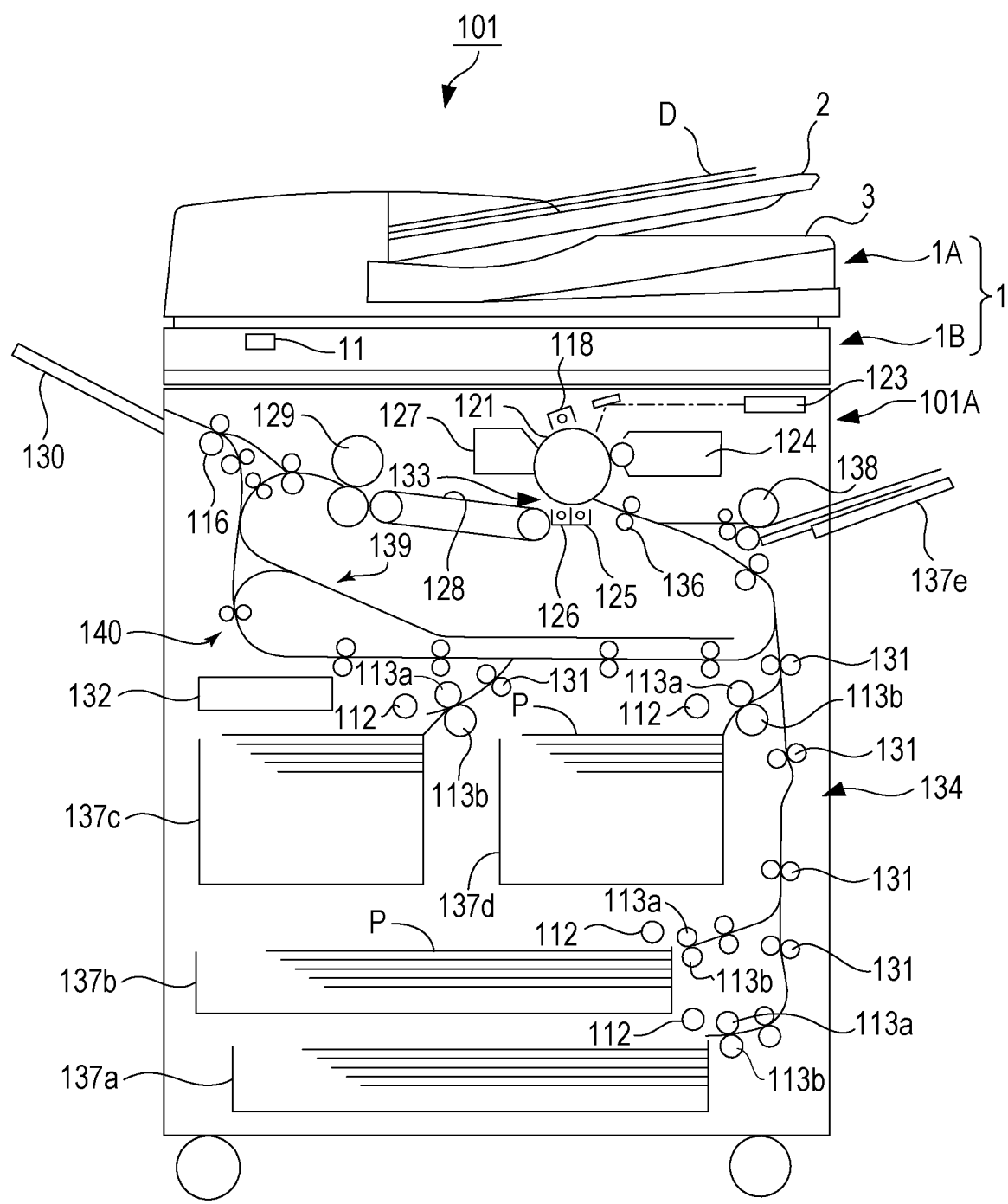
FIG. 1 is a view schematically illustrating an image forming apparatus according to an embodiment.

First, a configuration of a printer 101, which is an example of an image forming apparatus, is described with reference to FIG. 1. As illustrated in FIG. 1, the printer 101 is a multifunction apparatus equipped with a printer body 101A and an image reading apparatus 1. The printer body 101A forms an image on a recording medium P, which is a medium for recording. The image reading apparatus 1 is disposed above the printer body 101A and includes a reading unit body 1B and an ADF 1A. The image reading apparatus 1 reads image information by optically scanning a surface of a sheet, which is a document D. Types of sheets to be used as recording media P or documents D include a thin paper, a thick paper, a plastic film such as a sheet for overhead projector (OHP), a surface-treated paper such as a coated paper, a specially shaped sheet such as an envelope, and cloth.

The printer body 101A includes an image forming section 133 that forms an image on a recording medium P and a sheet feeder section 134 that feeds the recording medium P to the image forming section 133. The sheet feeder section 134 includes sheet accommodating units 137a, 137b, 137c, and 137d that can accommodate sheets having various sizes. Sheets accommodated in each of the sheet accommodating units are picked up by a pickup roller 112, separated one by one by a feed roller 113a and a retard roller 113b, and delivered to a corresponding conveying roller pair 131. The recording medium P is subsequently passed through a plurality of conveying roller pairs 131 disposed along a sheet conveyance path one after another and thereby conveyed to a registration roller pair unit 136.

A recording medium P placed on a manual feed tray 137e by a user is fed into the printer body 101A by a feed roller 138 and conveyed to the registration roller pair unit 136. The registration roller pair unit 136 corrects skew feeding by stopping the leading end of a recording medium P and starts conveying the recording medium P in synchronization with image forming operation (i.e., toner image formation) of the image forming section 133.

The image forming section 133 that forms an image on a recording medium P is an image forming unit that employs an electrophotographic process and is equipped with a photosensitive drum 121, in other words, a photoconductor. The photosensitive drum 121 is rotatable in a direction of conveying a recording medium P. An electrostatic charger 118, an exposure device 123, a developer device 124, a transfer charger 125, a separation charger 126, and a cleaner 127 are disposed around the photosensitive drum 121. The electrostatic charger 118 charges the surface of the photosensitive drum 121 uniformly. Subsequently, the exposure device 123 exposes the photosensitive drum 121 to light in accordance with image information that has been input by the image reading apparatus 1 or the like, and thereby forms an electrostatic latent image on the photosensitive drum 121.

The developer device 124, which accommodates a two-component developing agent including toner and carrier, develops the electrostatic latent image into a toner image by supplying charged toner to the photosensitive drum 121. The toner image carried on the photosensitive drum 121 is transferred onto a recording medium P, which has been conveyed from the registration roller pair unit 136, by the application of a bias electric field generated by the transfer charger 125. The recording medium P, onto which the toner image has been transferred, is separated from the photosensitive drum 121 by the application of a bias electric field generated by the separation charger and is conveyed toward a fusing section 129 by a pre-fixing conveyance unit 128. Debris on the photosensitive drum 121, such as residual toner that has not been transferred onto the recording medium P and remains on the drum, are removed by the cleaner 127, and thereby the photosensitive drum 121 is ready for the next image forming operation.

The recording medium P having conveyed to the fusing section 129 is nipped by a roller pair and thereby pressed and heated so as to melt the toner and adhere it to the medium. Thus, the image is fixed on the recording medium P. After finishing image output, the recording medium P with the fixed image thereon is discharged by a discharging roller pair 116 to a discharge tray 130, which protrudes outward from the printer body 101A. In the case of image forming on the back side of the recording medium P in duplex printing, the recording medium P having passed through the fusing section 129 is reversed upside down by the reversing section 139, and conveyed to the registration roller pair unit 136 by a duplex-printing conveyance unit 140. The recording medium P having another image formed by the image forming section 133 is discharged onto the discharge tray 130.

The image forming section 133 described above is an example of the image forming device that forms an image on a sheet. The image forming section 133 may be an image forming device that employs an intermediate image transfer system in which an image is transferred onto a recording medium via an intermediate transfer member. Alternatively, the image forming section 133 may be an image forming device other than the electrophotographic system, for example, an image forming device based on an ink jet printing system or an offset printing system.

Image Reading Apparatus

Figure 2:
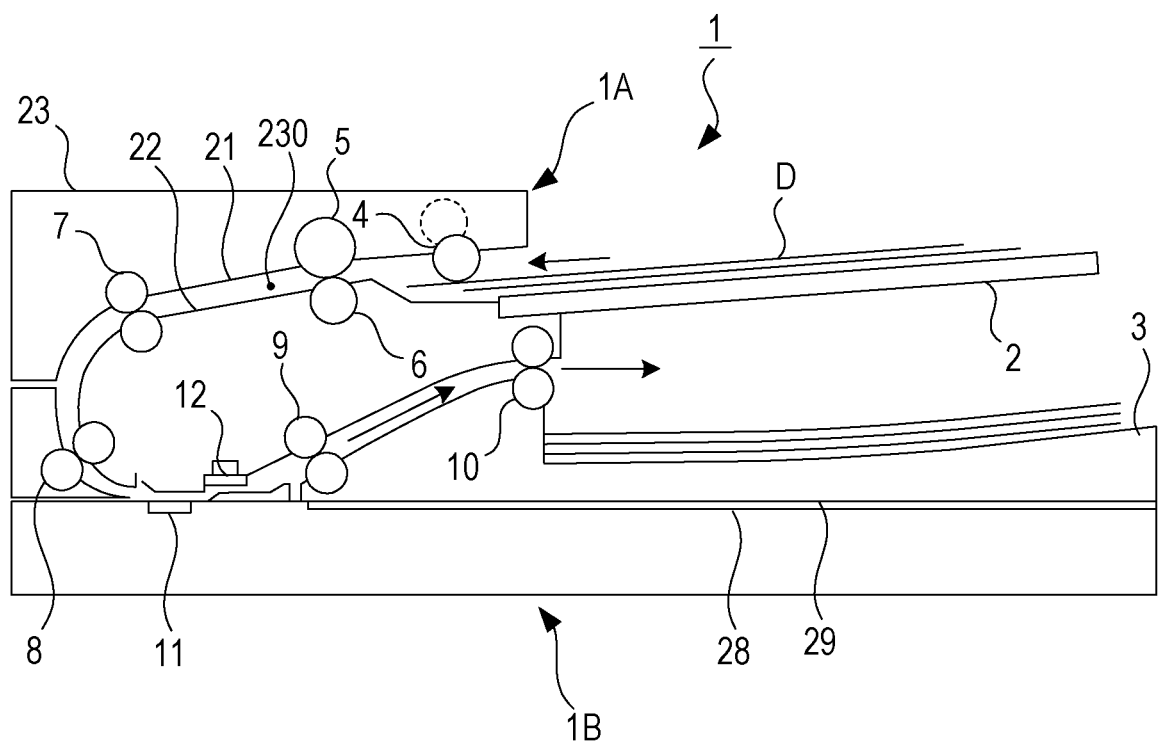
FIG. 2 is a view schematically illustrating an image reading apparatus mounted on the image forming apparatus.

Next, a configuration of the image reading apparatus 1 will be described with reference to FIG. 2. As illustrated in FIG. 2, the image reading apparatus 1 includes a reading unit body 1B and an ADF 1A. The ADF 1A is a sheet conveying apparatus according to the present embodiment. The image reading apparatus 1 further includes a first reading unit 11 disposed in the reading unit body 1B and a second reading unit 12 disposed in the ADF 1A. The following describes each of components constituting the image reading apparatus 1.

The first reading unit 11 reads image information from one side of a document D (see FIG. 1). The second reading unit 12 reads image information from the other side of the document D. The first reading unit 11 and the second reading unit 12 each includes components, such as an exposure lamp that emits light onto a document, an image sensor formed of a photoelectric conversion element, and mirrors and lenses (not illustrated). The light emitted by the exposure lamp and reflected by the document D reaches the image sensor via mirrors and lenses and forms an image thereon. The reflected light is converted into an image data by means of photoelectric conversion. Image data obtained by the first reading unit 11 and the second reading unit 12 are transmitted to a control section 132 (see FIG. 1) of the printer body 101A. Note that the first reading unit 11 and the second reading unit 12 do not always read both sides of a document simultaneously. Each can perform one-side reading separately.

The reading unit body 1B is fixed to the upper surface of the printer body 101A (see FIG. 1). As illustrated in FIG. 2, a flatbed original platen 28 is disposed on the upper surface of the reading unit body 1B. The first reading unit 11 is supported by a carriage (not illustrated) that is movable in the right-left direction in FIG. 2 along the original platen 28. The first reading unit 11 can move from the position illustrated in FIG. 2 over the entire length of the original platen 28.

The ADF 1A is supported by a hinge mechanism (not illustrated) that is disposed on the reading unit body 1B at a position on the deeper side in FIG. 2 so as to be able to open in the up-down direction with respect to the reading unit body 1B. A pressing board 29 is disposed in the ADF 1A so as to oppose the original platen 28 of the reading unit body 1B. The ADF 1A includes a document tray 2, a document conveying unit 23, and a discharge tray 3 in addition to the second reading unit 12. The document tray 2 supports documents D that are placed by a user. The document conveying unit 23 has a document conveyance path 230 formed therein and feeds each document D on the document tray 2 to the first reading unit 11 and the second reading unit 12 through the document conveyance path 230. The document D is read by the first reading unit 11 and the second reading unit 12 and then discharged onto the discharge tray 3.

The following describes the document conveying unit 23 in detail. The document conveying unit 23 includes a pickup roller 4, a feed roller 5, a separating roller 6, a registration roller pair unit 7, conveying roller pairs 8 and 9, and a discharging roller pair 10. These rollers are arranged sequentially in a direction of a sheet moving along the document conveyance path 230 (hereinafter referred to as "sheet conveying direction"). Note that the discharge tray 3 is positioned under the document tray 2, and the document conveyance path 230 is curved like a letter U as viewed in the sheet width direction that orthogonally intersects the sheet conveying direction (i.e., as viewed perpendicularly to FIG. 2).

The pickup roller 4, which is a feeder device for feeding a sheet in the embodiment, comes into contact with the top of the documents D stacked on the document tray 2 and feeds the topmost document D. Documents D picked up by the pickup roller 4 are separated one by one by the feed roller 5 and the separating roller 6 and subsequently conveyed downstream in the sheet conveying direction. The separating roller 6, which is pressed by the feed roller 5, is rotationally driven via a torque limiter in a direction opposite to the sheet conveying direction. Note that in place of the separating roller 6 serving as a retard roller, a roller member connected to a fixed shaft via a torque limiter or a pad-like separation member may be used.

The registration roller pair unit 7 is a registration device according to the present embodiment. When the document D is conveyed from the feed roller 5, a nip portion of the registration roller pair unit 7 receives the downstream end (otherwise referred to as the "leading end") of the document D in the sheet conveying direction, which causes the document D to warp and thereby corrects skew feeding of the document D. The registration roller pair unit 7 further conveys the document D of which skewed feeding is corrected through the curved portion of the document conveyance path 230. The conveying roller pair 8 further conveys the document D from the registration roller pair unit 7. Subsequently, the first reading unit 11 and the second reading unit 12 read images on the document D. The document D from which the images have been read is delivered by the conveying roller pair 9 to the discharging roller pair 10, which subsequently discharges the document D onto the discharge tray 3.

The image reading apparatus 1 attached to the printer body 101A is described here. However, the image reading apparatus 1 can be used as an independent apparatus separated from the image forming apparatus. In such a case, the image information obtained by the first reading unit 11 and the second reading unit 12 are transmitted to an external computer via a wired or wireless communication link, or alternatively, the image information is first stored in a storage device within the image reading apparatus and subsequently transmitted to a storage medium or to an external computer. Note that configurations described later in relation to Examples 1 and 2 are applicable not only to an image reading apparatus configured to read both sides of a document simultaneously using two image reading units 11 and 12 but also to an image reading apparatus that has either one of the image reading units 11 and 12.

The following describes the mechanism of skew feeding occurring to a document D conveyed by the ADF 1A of the image reading apparatus 1.

In the above ADF 1A, the leading end of a document D fed by the feed roller 5 enters the nip portion of the registration roller pair unit 7 to a predetermined depth while the registration roller pair unit 7 is in a stopped state. This prevents the leading end of the document D from moving forward and causes the document D to warp. As a result, the document D is aligned with the nip portion, and the skew feeding of the document D is corrected. However, if the position of the document D is not stable on the upstream side of the nip portion, skew feeding may not be fully corrected. For example, if the document D is curled as viewed in the sheet conveying direction, a portion of the leading end of the document may be caught by the registration roller pair unit 7 or conveyance guides instead of entering the nip portion to the predetermined depth. In such a case, the registration roller pair unit 7 cannot fully correct skew feeding of the document D, and the document D may be dispatched from the registration roller pair unit 7 in a skewed state.

Moreover, even after the registration roller pair unit 7 has corrected skew feeding of the document D, the document D may be disoriented in the conveying process before reaching the conveying roller pair 8 located downstream (see FIG. 2).

This is because the document conveyance path 230 has a width in the document thickness direction and the conveying distance between the registration roller pair unit 7 and the conveying roller pair 9 may vary depending on a particular route along which the document D passes in the document conveyance path 230. When a portion of the leading end of the document D moves along the inner wall of the curved document conveyance path 230 and another portion of the leading end moves along the outer wall of the document conveyance path 230, two portions of the leading end of the document may not arrive at the conveying roller pair 8 simultaneously. Since the conveying roller pair 8 does not correct skew feeding, difference in arrival timing of the two portions of the leading end causes the conveying roller pair 8 to feed the leading end of the document D in a skewed manner. Thus, the conveying roller pair 8 feeds the document D in the skewed manner even after the registration roller pair unit 7 corrects the skew feeding.

Example 1

In Example 1, skew feeding of the document D is suppressed by using a document pressing member, which is a movable guide. The document pressing member according to the present example will described with reference to FIGS. 3 and 4. In the following description, the terms "upstream" and "downstream" denote upstream and downstream of an indicated point on the document conveyance path 230 in the sheet conveying direction, unless otherwise stated.

Figure 3:
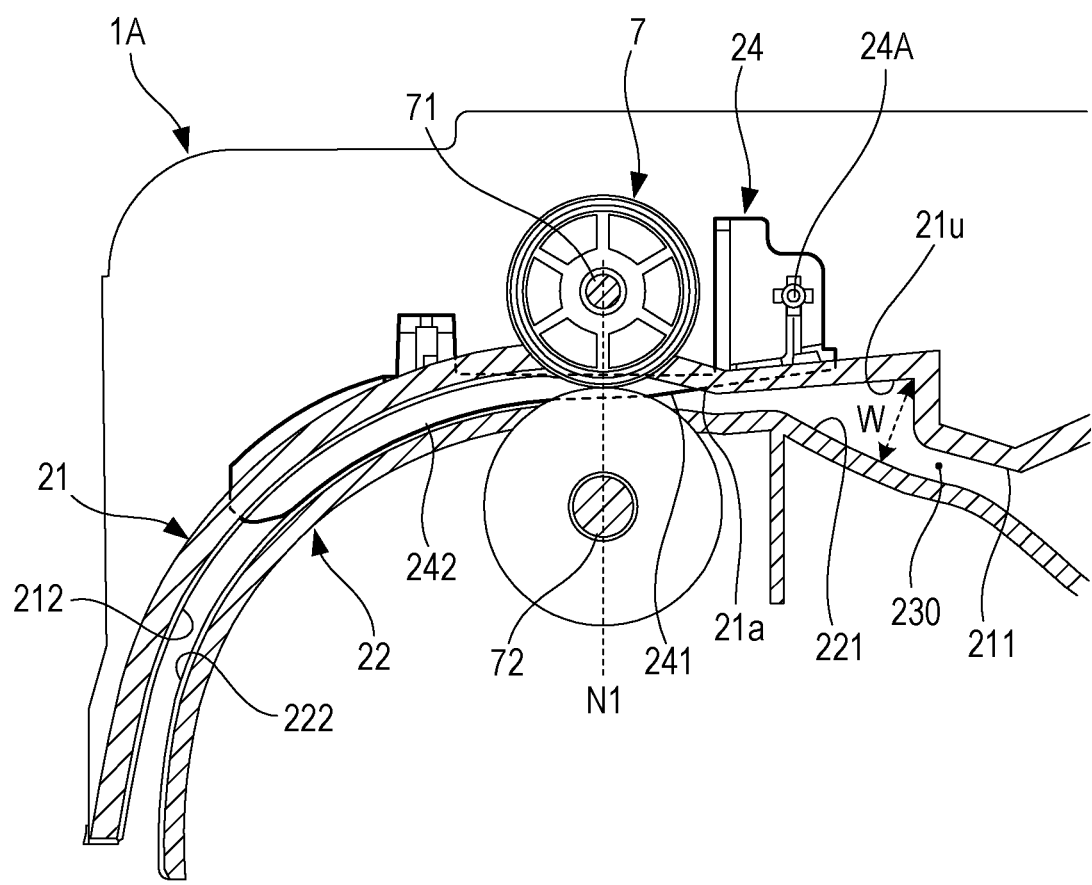
FIG. 3 is a cross-sectional view illustrating part of an ADF according to Example 1.

As illustrated in FIG. 3, the ADF 1A includes an upper side guide 21 and a lower side guide 22, which are guide members forming the document conveyance path 230 near the registration roller pair unit 7. The upper side guide 21 opposes the top side of a document D (the top side in the state in which a document D is placed on the document tray 2), whereas the lower side guide 22 opposes the bottom side of the document D. The upper side guide 21 and the lower side guide 22 include respective pre-registration guide surfaces 211 and 221 located upstream of the nip portion of the registration roller pair unit 7 and also include respective post-registration guide surfaces 212 and 222 located downstream of the nip portion. Note that "upstream of the nip portion" and "downstream of the nip portion" in the sheet conveying direction are defined with respect to a nip position N1 of the registration roller pair unit 7. The nip position N1 is a position, in the sheet conveying direction, at which as viewed in the width direction, a straight line connecting the axes of the roller shafts 71 and 72 of the registration roller pair unit 7 intersects the document conveyance path 230.

The document pressing member 24 is disposed on the same side as the upper side guide 21, in other words, disposed so as to oppose the top side of the document D. The document pressing member 24 extends upstream and downstream with respect to the nip position N1 of the registration roller pair unit 7. The document pressing member 24 is pivotally movable in the up-down direction in FIG. 3 about a shaft 24A that is positioned upstream of the nip position N1. In other words, the document pressing member 24 has an upstream portion 241 located upstream of the nip portion of the registration roller pair unit 7 and a downstream portion 242 located downstream of the nip portion, and the downstream portion 242 is movable in a direction closer to or away from the lower side wide 22.

The upper side guide 21 is a first guide of the present example, and the lower side guide 22 is a second guide thereof. Note that the first guide and the movable guide oppose a first side of a sheet, and the second guide opposes a second side of the sheet, which is opposite to the first side.

The pre-registration guide surface 211 of the upper side guide 21 and the pre-registration guide surface 221 of the lower side guide 22 form a space that allows the document D to warp when the leading end of the document D comes into contact with the registration roller pair unit 7. In the present example, a recess 21u that is recessed upward is provided in the upper side guide 21 so that the width W of the document conveyance path 230 in the document thickness direction is made greater than the width upstream or downstream thereof.

The upstream portion 241 of the document pressing member 24 inclines relative to the upper side guide 21 so as to guide the leading end of the document D to the nip portion of the registration roller pair unit 7. More specifically, upstream portion 241 protrudes from a portion 21a of the pre-registration guide surface 211 of the upper side guide 21 at a position upstream of the nip position N1 of the registration roller pair unit 7 in such a manner that the upstream portion 241 approaches the lower side guide 22 as the distance to the nip position N1 decreases. Accordingly, as viewed in the width direction of the document D, the document pressing member 24 restricts the route of the document D passing on the upstream side of the registration roller pair unit 7 through the document conveyance path 230 of which the width is defined by the upper side guide 21 and the lower side guide 22 in the document thickness direction.

The document conveyance path 230 curves on the downstream side of the registration roller pair unit 7. In other words, at least part of respective post-registration guide surfaces 212 and 222 of the upper side guide 21 and the lower side guide 22 form curved portions as viewed in the width direction of the document D. The document D, which is sent leftward from the registration roller pair unit 7 in FIG. 3, is guided downward along the curve of the document conveyance path 230. The post-registration guide surface 212 of the upper side guide 21 forms an outer circumferential surface defining the curve of the document conveyance path 230, whereas the post-registration guide surface 222 of the lower side guide 22 forms an inner circumferential surface defining the curve thereof. At least part of the downstream portion 242 of the document pressing member 24 curves along the curved post-registration guide surface 222 of the lower side guide 22. In the present example, the post-registration guide surface 222 and the downstream portion 242 are shaped substantially like an arc as viewed in the width direction.

Figure 4A:
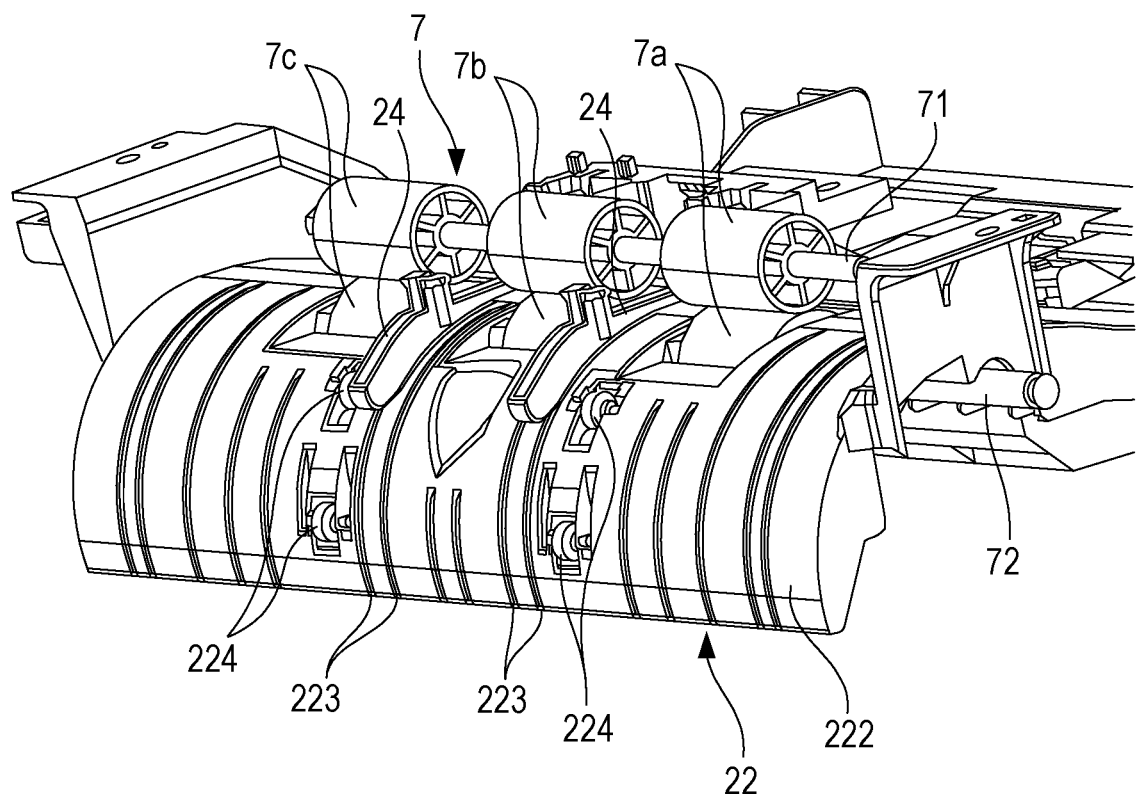
FIG. 4A is a perspective view illustrating part of the ADF according to Example 1.

As illustrated in FIG. 4A, each of the document pressing members 24 extends in the sheet conveying direction between a plurality of roller pairs 7a, 7b, and 7c of the registration roller pair unit 7. In the present example, the registration roller pair unit 7 is configured to have three pairs of rollers 7a, 7b, and 7c mounted on roller shafts 71 and 72. Two document pressing members 24 are disposed on both sides of the center roller pair 7b, respectively, at symmetrical positions in a direction parallel to the roller shafts 71 and 72 (i.e., in the document width direction).

Figure 4B:
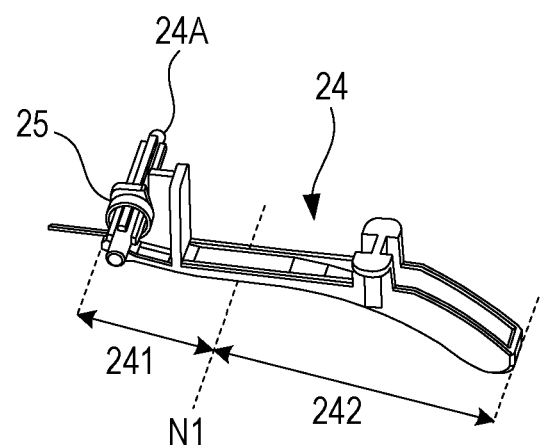
FIG. 4B is a perspective view illustrating a document pressing member according to Example 1.

As illustrated in FIG. 4B, a helical torsion spring 25 is mounted on a shaft portion 24A of each document pressing member 24. The shaft portion 24A serves as a pivot. The helical torsion spring 25 has one end engaging the frame of the ADF 1A and the other end engaging the document pressing member 24. The helical torsion spring 25 applies a moment to the document pressing member 24 in a direction of the document pressing member 24 approaching the lower side guide 22 (i.e., counterclockwise in FIG. 3). When the document D is not conveyed, the downstream portion 242 of the document pressing member 24 protrudes from the post-registration guide surface 212 of the upper side guide 21 and is in contact with the lower side guide 22. When a document D presses the document pressing member 24, the downstream portion 242 is separated from the lower side guide 22. Note that the helical torsion spring 25 is an example of an urging member. Any suitable elastic member may be used as the urging member, or alternatively, the document pressing member 24 may be configured to come into contact with the lower side guide 22 by its own weight.

In order to reduce the conveyance resistance of the document D, a plurality of rollers 224 and a plurality of ribs 223 extending in the sheet conveying direction are disposed on the post-registration guide surface 222 of the lower side guide 22, which is the inner circumferential surface defining the curved document conveyance path 230 (see FIG. 4A). In the present example, the document pressing members 24 are disposed at positions deviating from the positions of the rollers 224 so as not to touch the rollers 224.

As illustrated in FIG. 4B, the document pressing member 24 is preferably configured such that the downstream portion 242 is longer than the upstream portion 241 in the sheet conveying direction. With this configuration, the orientation of the document D can be stabilized readily on the downstream side of the registration roller pair unit 7 (to be described later).

Operation of Document Pressing Member

The following describes operation of the document pressing member according to the present example. The upstream portion 241 of a document pressing member 24 restricts the width of the document conveyance path 230 on the upstream side of the registration roller pair unit 7 as viewed in the width direction of the document D (see FIG. 3). This allows the leading end of the document D to be guided toward the nip portion of the registration roller pair unit 7 and to come into contact with the roller pairs 7a to 7c of the registration roller pair unit 7 irrespective of the orientation of the document D before the document D comes into contact with the registration roller pair unit 7. In other words, the skew feeding of the document D is corrected due to the entire portion of the leading end of the document D entering the nip portion of the registration roller pair unit 7 to a predetermined depth, which thereby improves/refines accuracy in correction of the skew feeding conducted by the registration roller pair unit 7.

While the document D is not conveyed, the downstream portion 242 of the document pressing member 24 is in contact with the lower side guide 22. When the document D presses the document pressing member 24, the downstream portion 242 pivotally moves in a direction away from the lower side guide 22. In other words, the registration roller pair unit 7 conveys the document D toward the conveying roller pair 8 with the document D pressing the document pressing member 24 upward.

Here, in the case of a conventional configuration of a document reading apparatus that does not include document pressing members 24, the orientation of the document D tends to change when the document D is a thin sheet (e.g., a thin sheet of paper) having a relatively small flexural rigidity. Moreover, the skew feeding of the thin document occurs again more frequently compared with a thick sheet of paper before the document D reaches the first reading unit 11 and the second reading unit 12. However, with the configuration of the present example, the downstream portion 242 of the document pressing member 24 restricts the route of the document D passing, which thereby controls the orientation of the document D. This suppresses the likelihood of the skew feeding newly occurring to the document D after the registration roller pair unit 7 corrects the skew feeding. The document D is thereby conveyed with its orientation being maintained stably. This can reduce the occurrence of a skewed image obtained by the first reading unit 11 and the second reading unit 12.

On the other hand, when a document D is a sheet having a relatively large flexural rigidity (e.g., a thick sheet of paper), the document pressing member 24 withdraws to a position further away from the lower side guide 22 compared with a thin sheet of paper. The withdrawal of the document pressing member 24 can reduce the likelihood of a conveyance failure caused by restraining the pass of the document D excessively, which increases the conveyance resistance.

As described above, the document pressing member 24 extends upstream and downstream of the nip portion of the registration roller pair unit 7 and has the downstream portion 242 movable in a direction closer to and away from the lower side guide 22. Thus, a various types of documents D can be conveyed with their orientation being maintained stably.

The force of urging the document pressing member 24 toward the lower side guide 22 is preferably adjusted, for example, by changing the spring constant of the helical torsion spring 25 in accordance with sheet types of documents D anticipated to be used. The document pressing member 24 is not limited to a member that pivotally moves about the pivot. It is sufficient that the document pressing member 24 is configured at least such that the downstream portion 242 moves closer to and away from the lower side guide 22.

Example 2

In Example 1 described above, the document pressing member 24 is disposed on the same side as the upper side guide 21, in other words, disposed so as to oppose the top side of the document D. On the other hand, in Example 2 described below, the document pressing member 24 is disposed on the same side as the lower side guide. In the following description, like elements that are configured and operated similarly to those described in Example 1 are denoted by like reference symbols, and thereby duplicated description will be omitted.

Figure 5:
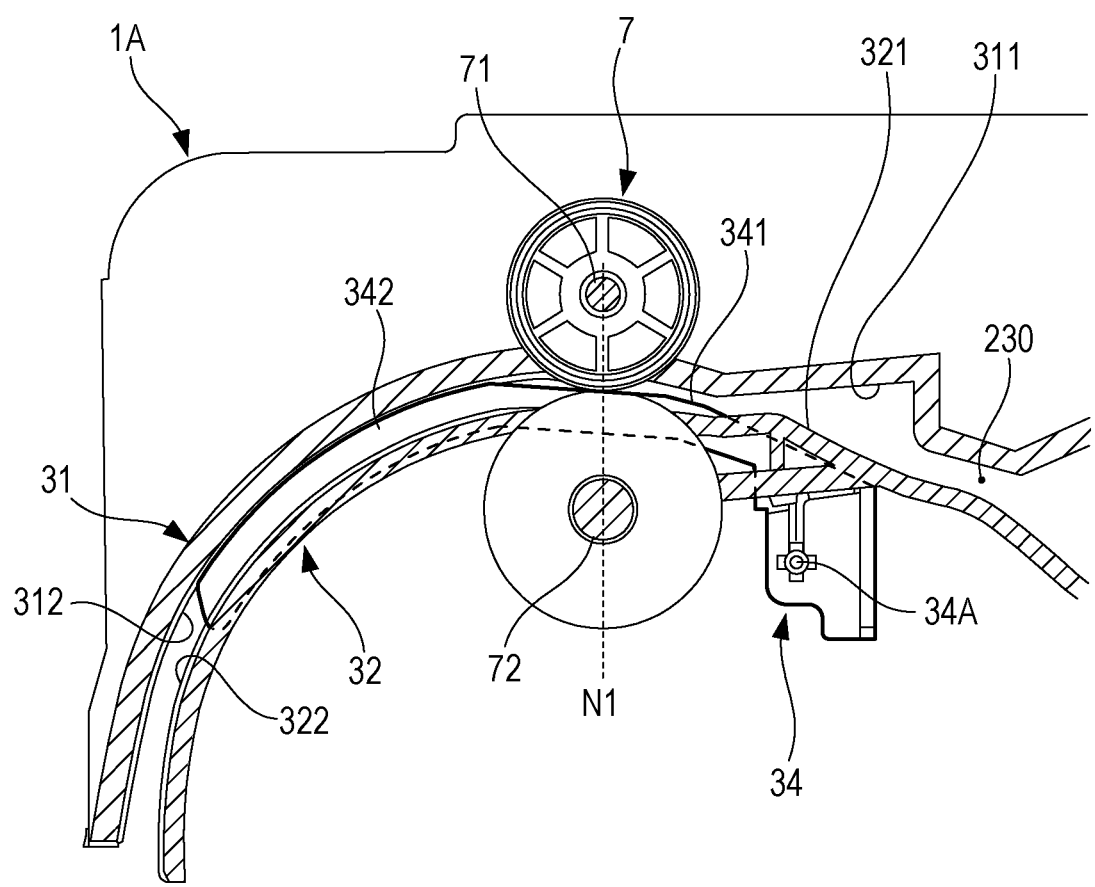
FIG. 5 is a cross-sectional view illustrating part of an ADF according to Example 2.

As illustrated in FIG. 5, a document pressing member 34 according to the present example is disposed below the document conveyance path 230. The document pressing member 34 includes an upstream portion 341 extending upstream of the nip position N1 of the registration roller pair unit 7 and a downstream portion 342 extending downstream of the nip position N1. The document pressing member 34 is pivotally movable about a shaft 34A in the up-down direction in FIG. 3. A helical torsion spring (not illustrated) is mounted on the shaft 34A. Due to an urging force of the helical torsion spring, the downstream portion 342 of the document pressing member 34 is brought into contact with a post-registration guide surface 312 of an upper side guide 31.

Note that in the present example, the upper side guide 31 corresponds to the second guide, and a lower side guide 32 corresponds to the first guide. The document pressing member 34, which is the movable guide according to the present example, is movable in such a manner that the downstream portion 342 moves closer to and away from the upper side guide 31 that serves as the second guide.

The upstream portion 341 of the document pressing member 34 inclines relative to a pre-registration guide surface 321 of the lower side guide 32 in such a manner that the upstream portion 341 protrudes more in the thickness direction (i.e., protrudes so as to approach a pre-registration guide surface 311 of the upper side guide 31) as the distance to the nip position N1 in the sheet conveying direction decreases. In other words, the upstream portion 341 restricts the width of the document conveyance path 230 on the upstream side of the registration roller pair unit 7 as viewed in the width direction of the document D. The leading end of the document D is thereby guided to the nip portion of the registration roller pair unit 7.

In addition, while the document D is not conveyed, the downstream portion 342 of the document pressing member 34 protrudes from the post-registration guide surface 322 of the lower side guide 32 and is in contact with a post-registration guide surface 312 of the upper side guide 31. When the document D presses the document pressing member 34, the downstream portion 342 is separated from the upper side guide 31. The document pressing member 34 restricts the route of a document D such as a thin sheet of paper and can simultaneously reduce the likelihood of a conveyance failure occurring to a document D such as a thick sheet of paper due to the presence of the document pressing member 34.

In other words, with the configuration according to the present example, the operation of the document pressing member 34 both on upstream side and on downstream side of the registration roller pair unit 7 allows a sheet to be conveyed with its orientation being stably maintained. This stabilizes the orientation of the document conveyed into the first reading unit 11 and the second reading unit 12, which leads to provision of less skewed image data.

Other Embodiments

In Examples 1 and 2, the document pressing members 24 and 34, which serve as movable guides, are disposed in the ADF 1A. However, the movable guide may be disposed in other types of sheet conveying apparatuses. For example, the movable guide extending upstream and downstream of the registration roller pair unit 136 may be disposed in the printer body 101A described above (see FIG. 1). In this case, as described in relation to the document pressing members 24 and 34 in Example 1 and 2, the operation of the movable guide stabilizes the orientation of a recording medium P fed into the image forming section 133, which thereby provides a less skewed image output.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-122287 filed Jun. 27, 2018, which is hereby incorporated by reference herein in its entirety.

What is claimed is:

1. A sheet conveying apparatus comprising:
a sheet conveyance section configured to convey a sheet in a sheet conveying direction;
a roller pair unit configured to nip the sheet by a nip portion of the roller pair unit and convey the sheet, wherein the roller pair unit corrects skewing of the sheet by abutting a leading end of the sheet conveyed by the sheet conveyance section against the nip portion;
a first guide configured to oppose a first side of the sheet and to guide the sheet;
a second guide configured to oppose a second side of the sheet that is opposite to the first side of the sheet; and
a movable guide including an upstream portion extending upstream in the sheet conveying direction with respect to the nip portion and a downstream portion extending downstream in the sheet conveying direction with respect to the nip portion,
wherein the movable guide is configured to oppose the first side of the sheet and to be movable in such a manner that, in a case where the movable guide moves, the downstream portion of the movable guide moves closer to or away from the second guide.

2. The sheet conveying apparatus according to claim 1,
wherein, in a case in which the roller pair unit does not convey the sheet, the downstream portion of the movable guide is in contact with the second guide, and
wherein, in a case in which the roller pair unit conveys the sheet, the downstream portion is pressed by the sheet to separate the downstream portion from the second guide.

3. The sheet conveying apparatus according to claim 1, further comprising an urging member configured to urge the movable guide in a direction in which the downstream portion of the movable guide approaches the second guide.

4. The sheet conveying apparatus according to claim 1,
wherein the first guide has a curved portion at a position downstream of the nip portion in the sheet conveying direction,
wherein the curved portion curves as viewed in a width direction that intersects the sheet conveying direction, and
wherein the downstream portion of the movable guide curves along the curved portion.

5. The sheet conveying apparatus according to claim 4, wherein the curved portion forms a curve of a conveyance path, and the first guide is positioned at an inner circumference of the curve.

6. The sheet conveying apparatus according to claim 4, wherein the curved portion forms a curve of a conveyance path, and the first guide is positioned at an outer circumference of the curve.

7. The sheet conveying apparatus according to claim 1, wherein the upstream portion of the movable guide inclines relative to a guide surface of the first guide in such a manner that the upstream portion protrudes more toward the second guide as thea distance to the nip portion decreases in the sheet conveying direction.

8. The sheet conveying apparatus according to claim 1,
wherein the roller pair unit includes roller shafts and a plurality of roller pairs supported by the roller shafts, and
wherein the movable guide extends in the sheet conveying direction so as to pass between the roller pairs arranged in a direction parallel to the roller shafts.

9. The sheet conveying apparatus according to claim 1, wherein the movable guide has a pivot disposed at a position upstream of the nip portion of the roller pair unit in the sheet conveying direction and is configured to pivotally move about the pivot.

10. The sheet conveying apparatus according to claim 1, wherein the upstream portion guides the leading end of the sheet to the nip portion of the roller pair unit.

11. An image reading apparatus, comprising:
a sheet conveyance section configured to convey a sheet in a sheet conveying direction;
a roller pair unit configured to nip the sheet by a nip portion of the roller pair unit and convey the sheet, wherein the roller pair unit corrects skewing of the sheet by abutting a leading end of the sheet conveyed by the sheet conveyance section against the nip portion;
a first guide configured to oppose a first side of the sheet and to guide the sheet;
a second guide configured to oppose a second side of the sheet that is opposite to the first side of the sheet;
a movable guide including an upstream portion extending upstream in the sheet conveying direction with respect to the nip portion and a downstream portion extending downstream in the sheet conveying direction with respect to the nip portion, wherein the movable guide is configured to oppose the first side of the sheet and to be movable in such a manner that, in a case where the movable guide moves, the downstream portion of the movable guide moves closer to or away from the second guide; and
an image reading device configure to read an image on the sheet conveyed by the roller pair unit.

12. An image forming apparatus, comprising:
a sheet conveyance section configured to convey a sheet in a sheet conveying direction;
a roller pair unit configured to nip the sheet by a nip portion of the roller pair unit and convey the sheet, wherein the roller pair unit corrects skewing of the sheet by abutting a leading end of the sheet conveyed by the sheet conveyance section against the nip portion;
a first guide configured to oppose a first side of the sheet and to guide the sheet;
a second guide configured to oppose a second side of the sheet that is opposite to the first side of the sheet;
a movable guide including an upstream portion extending upstream in the sheet conveying direction with respect to the nip portion and a downstream portion extending downstream in the sheet conveying direction with respect to the nip portion, wherein the movable guide is configured to oppose the first side of the sheet and to be movable in such a manner that, in a case where the movable guide moves, the downstream portion of the movable guide moves closer to or away from the second guide; and an image forming device configure to form an image on the sheet conveyed by the roller pair unit.

\* \* \* \* \*